Patented May 23, 1933

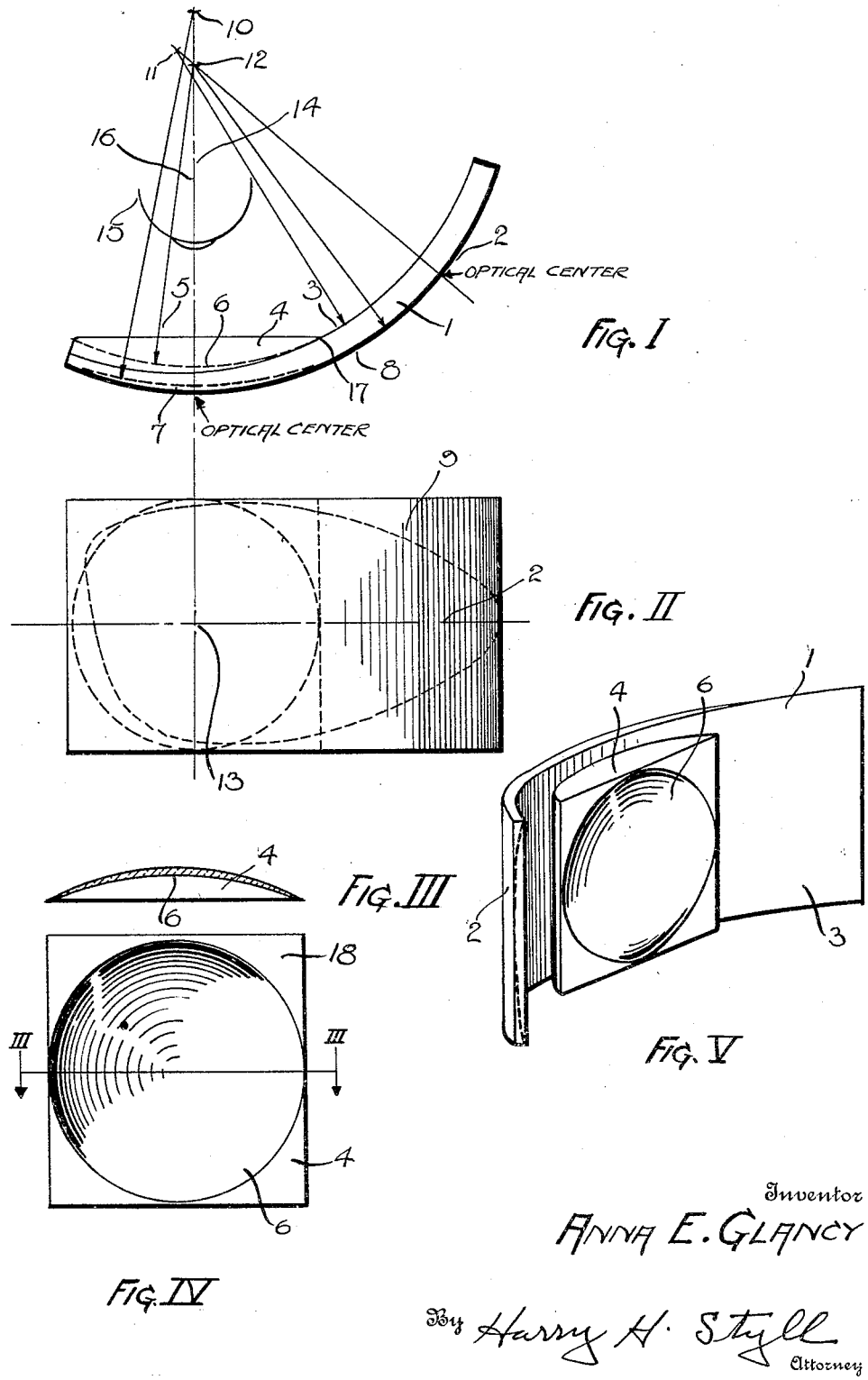

1,910,466

UNITED STATES PATENT OFFICE

ANNA E. GLANCY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

OPHTHALMIC LENS

Application filed August 30, 1929. Serial No. 389,577.

This invention relates to improvements in ophthalmic lenses and has particular reference to a lens having a clear vision base portion embracing a portion having a prescription corrective power therein, and to an improved process for making the same.

A principal object of the invention is to provide improved means by which a prescription power lens including a spherical element in its power may be embodied in a cylindrical shaped clear vision base portion.

Another object of the invention is to provide an improved process for making such a lens, which process will produce a lens much lighter in weight than one having prescription power throughout, and which process will also reduce the cost of production of such lens, and above all will increase the facility with which such prescription lenses may be supplied to the wearer.

Another object of the invention is to provide an improved lens blank for such a lens, which lens blank may be made by the manufacturer and supplied to the prescription dealer so that the prescription curve may be placed thereon by grinding one surface only, greatly facilitating the service in such lenses and reducing their cost considerably over that of the prior art methods.

Other objects and advantages will become apparent from the following description taken in connection with the accompanying drawing, and it will be apparent that many changes may be made in the details of construction and arrangement of parts and steps of the process without departing from the spirit of the invention as expressed in the accompanying claims.

I, therefore, do not wish to be limited to the exact details shown and described as the preferred forms only have been shown by way of illustration.

Referring to the drawing:

Fig. I is a top view of a lens embodying the invention;

Fig. II is a front or plan view of Fig. I;

Fig. III is a cross section on line III—III of Fig. IV;

Fig. IV is a front or base view of the prescription element;

Fig. V is a perspective view showing the base and prescription elements separated but in aligned position.

The use of ophthalmic lenses having wide fields of vision is becoming more pronounced every day owing to the need of such lenses by aviators and by automobilists. While clear vision base lenses whose manufacture is fairly simple may be used, yet they do not meet the requirements of individuals requiring certain prescription power correction lenses. It will be apparent at a glance that if it were attempted to grind such a wide field lens with prescription curves throughout they would necessarily have to be excessive in thickness, making their use unwieldly and in many instances making it impossible to grind the desired curves. It is also clear that if the clear vision base lens is cylindrical in shape, it is exceedingly difficult, if not impossible, to place thereon a prescription power lens embodying a spherical power as one of its elements.

It is, therefore, one of the prime objects of my invention to provide means by which such a wide field lens may be made with a clear vision base having a portion thereof of the prescription power required, and particularly to make such a lens having a cylindrical clear vision base.

It has been proven by experience that if it is desired to make such a wide field lens with prescription powers on it that it is practically a factory job, that is, the patient's prescription will have to be sent to the factory and the lens made special at the factory. This means an excessive cost of production and a great delay in service to the patient.

It is, therefore, another prime object of my invention to make a blank for such a lens that may be made by the manufacturer and supplied to the prescription dealer so that the required prescription power may be placed on by the prescription dealer by simply grinding one surface, making it possible to provide exactly the same kind of prescription service for such a lens as is given today for ordinary eyeglass and spectacle lenses, constituting a difference in saving from four to five times the amount that would have to be paid for a specially ground lens at the factory.

Referring to the drawing, wherein similar reference characters denote corresponding parts throughout, I have adopted for the sake of illustration a cylindrical clear vision base lens 1 having an optical center at the point 2, such a lens being of the type shown in Patent No. 1,697,030, January 1, 1929. This clear vision base lens 1 has a substantially zero power. On the surface 3 of the base lens 1, I superimpose my prescription element 4. This element 4 may have, as shown in Fig. I, on the front side the same curvature as the curve 3 of the base lens 1. Its rear side 5 may be flat but it need not necessarily be so. This prescription element 4 may be made integral with the base lens 1 by molding it to shape in the blank of the base 1, or it may be made in a separate piece and cemented or fused to the base 1. I can grind into the surface 5 of the element 4 a spherical concave curvature 6 and to get the prescription power through the element 4 I can grind the curve 7 on the outside surface 8 of the base 1. This curvature 7 may be either a spherical curvature or a surface having a difference of curvature in its two major meridians commonly known as a toric surface.

From the foregoing it will be seen that I have built up a cylinder base and provided a bunch surface for the prescription element and then ground a spherical curve on the bunch portion and completed the power required by the prescription by grinding on the opposite side of the clear vision base. It will be seen that on the surface 8 the vertical meridian is flat so I, therefore, can grind any convex curve to the limit of the thickness. In the horizontal meridian I have used a plus 9 diopter curve. I, therefore, can grind anything flatter than a plus 9 diopter curve. For example, if it is desired to make a one diopter lens I can make the curve 6 a standard minus six diopter curve ground into the surface 5 of the prescription element 4 and grind a plus seven diopter curve on the outside; that is to say, on the surface 8, and I can combine any reasonable cylinder in the prescription, preferably making my lens in one piece, but as stated, it can be made either by cementing or fusing the prescription curve 4 to the base element 1.

It will be clear also that the prescription lens bounded by the curve 6 can be (as any spherical lens can be) corrected for marginal astigmatism or errors of focus, as is well known in the prior art.

One of the most important features of my invention is the fact that the clear vision base element 1 having the prescription element 4 secured thereto and having the spherical curve 6 ground thereon may be made by the manufacturer and supplied to the prescription dealer.

When the prescription is sent to the prescription dealer it is necessary only for him to take this blank and grind thereon the curve 7 of the required power to produce a lens having a cylindrical clear vision base portion with the prescription lens of desired power thereon, the blanks being supplied to the trade by the manufacturer in a manner identical with that for supplying the present day eyeglass and spectacle lenses.

After the curves 6 and 7 have been placed on the blank the lens may be cut to desired outline 9, as shown by dotted lines in Fig. II.

Referring to Fig. I, it will be seen that the center of the curve 8 is at the point 12; that the center of the curve 3 is at the point 11; that the center of the curve 6 is at the point 12, the center of 7 is at 10, and that, therefore, the optical center of the prescription portion will lie at the point 13, Fig. II, that is, on the line passing through the centers 10 and 12, and the optical center of the base portion will lie at the point 2, that is, on a line passing through the centers 11 and 12. It is clear that other forms of the base lens 1 may be used, such as one having concentric surfaces or the like, and that the lens can be made having a single optical center at the point 13 or having two optical centers, one at point 13 and one at point 2, as shown. The prescription portion of the lens has been shown in Fig. I as being in the line of straight ahead vision, that is, this lens should be placed in the useful field of vision of the eye when the lens is in place on the wearer. The eye is indicated at 15 and the center of rotation thereof at the point 16. The lens may be made of any desired shades of color, that is, the base lens 1 and the prescription portion 4 may be both made of white optical glass, or either or both may be of any desired shade of glass for any required purpose.

The edge 17 of the section 4 is preferably made a knife edge, as one of the advantages of this type of lens is that it is much lighter than a lens having a prescription power throughout its surface. Therefore, the thinner and smaller the portion 4, the lighter the lens will be. It is clear that one optical center or two optical centers may be placed, as desired. The finished lens can be cut as desired; for example, the optical center can be related in desired position with the nasal edge of the lens. It is clear also that there will be small corners 18 of useless vision but these will be permissible owing to the large field and size of the lens.

If it is desired to make this lens in one piece the blank having the clear vision portion 1 and the prescription portion 4 will first be molded with a flat surface at 18. The curve 3 is next blended by surfacing into the portion 4 and the curve 6 finished thereon. The curve 8 may next be finished on the outside for the complete blank. In those cases where the clear vision lens and the prescription portion 14 are made separately the lens 1 will be made as shown in the above referred to patent. The section 4 will be shaped to fit the inside curve, and then either fused or cemented with Canada balsam thereto and the curve 6 ground therein. All the surfaces of this lens or the blank therefor can be made on usual prior art grinding processes for grinding spherical, toric or cylindrical curves.

It is clear also that if desired a cylindrical clear vision portion base may not be used but a spherical one could be used instead, the general method of producing the lens and its operation being otherwise the same.

It will be understood that in cases where the blank is supplied by the manufacturer to the prescription dealer the curve 6 will be made in different bases of various curves in order that the prescription dealer will have a sufficiently varied stock to be able to select a blank to make a lens of the required prescription.

From the foregoing it will be seen that I have provided an improved process simple and economical in operation for the production of a lens capable of carrying out all the objects of the invention.

Having described my invention, I claim:

1. A blank for an ophthalmic lens comprising a continuous clear vision base of cylindrical surface having divergent optical surfaces and substantially zero power and having a raised portion on one side, said raised portion covering a portion only of said base adjacent the nasal side thereof and having a surface thereon with a spherical power element.

2. A blank for an ophthalmic lens comprising a clear vision base of cylindrical optical surface and having a raised portion on one side, said raised portion covering a portion only of said base and having a surface thereon with a spherical power element and the surface of the base opposite the raised portion having a power element different from that of the rest of said surface of the base.

3. The process of making a multifocal lens comprising forming a clear vision optical base portion of cylindrical curvature, surfacing both sides of said base to a different optical surface with the centers of curvature separated one from the other, superimposing upon one side of the base portion a section having a contact face of similar cylindrical curvature to said base portion and covering only a portion thereof adjacent the nasal side, surfacing the exposed face of said section to a spherical curve, and surfacing the side of the cylindrical base portion opposite said section to an optical power surface.

4. A multifocal lens comprising a plane cylindrical base portion surfaced to an optical finish, a partial section thereof having a flat exposed surface superimposed in the direct field of vision on the portion, a spherical base curve on said section at least partially within the confines of the flat exposed surface and a power curve surfaced on that portion of the base opposite said section.

5. A multifocal lens comprising a plane cylindrical base portion having an optical center therein, a section having a flat exposed surface superimposed in the direct field of vision on the base portion, a spherical base curve surfaced on the flat exposed surface and a prescription power curve surfaced on the opposite side of the base portion to the superimposed surface having a different optical center to the base portion.

6. The process of making an ophthalmic lens comprising forming a base lens of substantially zero power with divergent surfaces and an optical center, superimposing a lens section thereon covering a portion of said base lens on the nasal side thereof making a power surface on the non-contacting face of the section, and shaping the portion of the non-contacting surface of the base opposite said section to a power surface different from the rest of said non-contacting surface.

7. The process of making an ophthalmic lens having a length extending from the nasal canthus of the eye beyond the temporal canthus thereof when in place before the eye comprising making a cylindrical base lens with optical surfaces, superimposing a lens section thereon which covers a portion only of said base lens on the nasal side thereof, shaping a power surface on the non-contacting face of the section and shaping the portion of the non-contacting face of the base opposite said section to a power surface different from the rest of said non-contacting surface.

8. An ophthalmic lens having a base portion of substantially zero power, divergent surfaces and an optical center and an additional lens section constituting a raised portion adjacent the nasal edge of the base portion and extending only part way of said base, a power surface on said section on the face removed from said base, and a power surface on the base portion on the side removed from said section and opposite said section, said section and base portion opposite the section having an optical center between the geometrical center of the lens and its nasal edge.

9. An ophthalmic lens having a base portion of substantially zero power, divergent surfaces and an optical center, and an additional lens section constituting a raised portion adjacent the nasal edge of the base portion and extending only part way of the base portion, a power surface on said section on the face removed from the base portion and a power surface on the base portion on the side removed from said section and opposite the section having an optical center between the geometrical center of the lens and its nasal edge and the optical center of the base portion located between the geometrical center of the lens and its temporal edge.

10. An ophthalmic lens comprising a base lens of substantially zero power with divergent surfaces and an optical center, a lens section superimposed thereon covering a portion of said lens only on the nasal side thereof, a power surface on the non-contacting face of the section and a power surface on the portion of the non-contacting surface of the base opposite said section said power surface being different from the rest of said non-contacting surface.

11. An ophthalmic lens having a length extending from the nasal canthus of the eye beyond the temporal canthus thereof when in place before the eye, comprising a cylindrical base lens with optical surfaces, a lens section superimposed thereon and covering a portion of said lens only on the nasal side thereof, a power surface on the non-contacting face of the base opposite said section said surface being different from the surface of the rest of said non-contacting face of the base.

12. The process of making a multifocal lens comprising forming on a transparent block a clear vision base of cylindrical optical surface, forming a raised portion on one surface of said base, surfacing a spherical curvature on said raised portion, and surfacing only the portion of the opposite side of said base which is immediately opposite the raised portion, with a curvature to give a desired power to the raised portion.

ANNA E. GLANCY.